(12) United States Patent
Le Cras et al.

(10) Patent No.: US 7,909,893 B2
(45) Date of Patent: Mar. 22, 2011

(54) ELECTRODE FOR A LITHIUM BATTERY, METHOD FOR PRODUCTION OF SUCH AN ELECTRODE AND LITHIUM BATTERY COMPRISING SAID ELECTRODE

(75) Inventors: Frederic Le Cras, Notre Dame de l'Osier (FR); Sebastien Martinet, Grenoble (FR); Carole Bourbon, Saint-Michel de Saint-Geoirs (FR); Sebastien Launois, Grenoble (FR)

(73) Assignee: Commissariat a l'Energie Atomique, Paris (FR)

( * ) Notice: Subject to any disclaimer, the term of this patent is extended or adjusted under 35 U.S.C. 154(b) by 1113 days.

(21) Appl. No.: 11/631,168

(22) PCT Filed: Jul. 21, 2005

(86) PCT No.: PCT/FR2005/001889
§ 371 (c)(1),
(2), (4) Date: Dec. 29, 2006

(87) PCT Pub. No.: WO2006/018514
PCT Pub. Date: Feb. 23, 2006

(65) Prior Publication Data
US 2007/0245546 A1    Oct. 25, 2007

(30) Foreign Application Priority Data
Jul. 26, 2004    (FR) ..................... 04 08246

(51) Int. Cl.
*H01M 4/82* (2006.01)
*H01M 4/58* (2010.01)
*H01M 4/88* (2006.01)
(52) U.S. Cl. .................. 29/623.1; 429/231.95; 502/101
(58) Field of Classification Search ................. 29/623.1, 29/623.3–623.5; 429/208–209, 218.1–227, 429/229, 231, 231.2–231.95; 502/101
See application file for complete search history.

(56) References Cited

U.S. PATENT DOCUMENTS

| | | | | |
|---|---|---|---|---|
| 5,432,029 | A * | 7/1995 | Mitate et al. ................. 429/338 |
| 6,235,427 | B1 * | 5/2001 | Idota et al. ................. 429/218.1 |
| 6,451,482 | B1 | 9/2002 | Watanabe et al. |
| 6,824,922 | B2 * | 11/2004 | Park et al. ................. 429/219 |
| 6,933,077 | B2 * | 8/2005 | Sudano et al. ............... 429/208 |
| 2002/0039687 | A1 * | 4/2002 | Barker et al. ............ 429/231.95 |
| 2002/0182497 | A1 * | 12/2002 | Kohzaki et al. ............... 429/221 |
| 2003/0077517 | A1 | 4/2003 | Nakanishi et al. |
| 2003/0091889 | A1 * | 5/2003 | Sotomura et al. ............... 429/40 |
| 2003/0170540 | A1 | 9/2003 | Ohzuku et al. |
| 2003/0219652 | A1 | 11/2003 | Yoshida |
| 2004/0131940 | A1 | 7/2004 | Suzuki et al. |
| 2005/0079419 | A1 * | 4/2005 | Jan et al. ................. 429/231.95 |
| 2005/0196334 | A1 * | 9/2005 | Saidi et al. ................. 423/306 |
| 2009/0104530 | A1 * | 4/2009 | Shizuka et al. ............... 429/223 |

FOREIGN PATENT DOCUMENTS

| EP | 1 296 391 A1 | 3/2003 |
|---|---|---|
| EP | 1 372 202 A1 | 12/2003 |
| EP | 1 403 944 A1 | 3/2004 |

OTHER PUBLICATIONS

Wang, Zhaoxiang et al. "Structural and electrochemical characterizations of surface-modified LiCoO2 cathode materials for Li-ion batteries," Solid State Ionics, vol. 148, 335-342 pp (2002).
Schlyakhtin, O.A., et al. "Particle size control of LiCoO2 powders by powder engineering methods," Journal of the European Ceramic Society, vol. 23, 1893-1899 pp (2003).
Bewlay, S.L., et al. "Conductivity improvements to spray-produced LiFePO4 by addition of a carbon source," Materials Letters, vol. 58, 1788-1791 pp (2004).
Sengupta, S., et al. "Low Temperatures Synthesis, Characterization and Evaluation of LiMn2O4 for Lithium Ion Batteries," Canadian Metallurgical Quarterly, vol. 43, No. 1, 89-94 pp (2004).

* cited by examiner

*Primary Examiner* — Dah-Wei D Yuan
*Assistant Examiner* — Claire L (Rademaker) Roe
(74) *Attorney, Agent, or Firm* — Oliff & Berridge, PLC

(57) ABSTRACT

The invention relates to a lithium battery, comprising at least one lithium intercalation compound, made up of crystallites and obtained by a production method, comprising at least the following steps: formation of a homogeneous mixture of at least one precursor for the lithium intercalation compound with a given adjunct, chemically stable with relation to crystallites and designed to limit the growth of crystallites or crystallite precursors during the formation thereof, thermal treatment of the homogeneous mixture for the synthesis of the lithium intercalation compound in the form of crystallites and to give a composite material comprising at least two phases formed respectively by the lithium intercalation compound and the adjunct and forming of the composite material to give said electrode. The invention further relates to an electrode obtained by said method and lithium battery comprising such an electrode.

11 Claims, 1 Drawing Sheet

ELECTRODE FOR A LITHIUM BATTERY, METHOD FOR PRODUCTION OF SUCH AN ELECTRODE AND LITHIUM BATTERY COMPRISING SAID ELECTRODE

BACKGROUND OF THE INVENTION

The invention relates to a method for production of an electrode for a lithium battery comprising at least a lithium intercalation compound made up of crystallites.

The invention also relates to an electrode obtained by one such method and to a lithium battery comprising one such electrode.

STATE OF THE ART

Lithium batteries are tending to replace nickel-cadmium (Ni—Cd) or nickel-metal hydride (Ni-MH) storage batteries as autonomous energy source in portable equipment. The performances and more particularly the specific and volume energy densities of lithium batteries and of lithium-ion batteries are in fact higher than those of Ni—Cd and Ni-MH batteries.

The positive electrode of lithium batteries generally comprises an active compound called ion intercalation compound, such as $TiS_2$, $NbSe_3$, $V_2O_5$, $LiCoO_2$, $LiNiO_2$, $LiMn_2O_4$ and $LiV_3O_8$.

In lithium-ion batteries, the intercalation compound $LiCoO_2$ presents very good electrochemical properties. However, the limited quantity and the price of cobalt are an obstacle to such lithium-ion batteries in applications requiring high storage capacities becoming generalized.

Moreover, replacing the cobalt by nickel or manganese is not satisfactory. $LiNiO_2$ is in fact chemically unstable in the de-intercalated state, i.e. in the charged state for the battery. $LiNiO_2$ can then form active oxygen by disproportionation and the active oxygen formed is liable to react with the organic solvents of the electrolyte causing the battery to explode.

The $LiMn_2O_4$ compound, stable at room temperature, is liable to be attacked by small quantities of HF contained in the electrolyte, above a temperature of about 55° C. This attack then causes dissolution of the manganese and a rapid and irreversible drop in the battery capacity. For example, in the article "Low temperature synthesis characterization and evaluation of $LiMn_2O_4$ for lithium ion battery (Canadian metallurgical quarterly, vol 43, pages 89 to 93), S. Sengupta and al. obtain a manganese and lithium oxide by means of a low-temperature method, which oxide presents a higher discharge behaviour than that of a material available on the market. S. Sengupta and al. attribute this improved efficiency to the sub-micron size of the crystallite of the synthesized powder.

It has been proposed to replace lithium and transition metal oxides by materials having a isotype structure of olivine, more particularly of $LiMPO_4$ type, where M is a metal such as iron. For example, the reversible insertion and de-insertion reaction of lithium in $LiFePO_4$ is as follows:

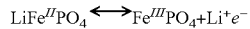

$$LiFe^{II}PO_4 \leftrightarrow Fe^{III}PO_4 + Li^+ e^-$$

Thus, when this reaction takes place, the iron goes reversibly from a +II oxidation state to a +III oxidation state, a cation $Li^+$ and an electron then being released. However the insertion and de-insertion potential of the $LiFePO_4$ compound, i.e. the electrochemical potential of the $FePO_4$/$LiFePO_4$ couple, is 3.43V with respect to the electrochemical potential of the $Li^+/Li$ couple. Furthermore, the specific capacity of $LiFePO_4$ is 170 mAh/g. These two values enable a theoretical specific energy density of 580 Wh/Kg to be obtained, whereas the practical specific energy density of $LiCoO_2$ is about 530 Wh/kg.

It is however difficult to implement a practical specific energy close to the theoretical value of $LiFePO_4$. Indeed, $LiFePO_4$ not having a mixed valency and the nature of the path which the electron has to take in the olivine structure give to the $LiFePO_4$ compound an electronic insulator nature. Substitutions have been attempted to generate a mixed valency iron compound but they did not provide any real progress from an electrochemical point of view.

To remedy this drawback and to obtain a positive electrode that is sufficiently electron-conducting, it is common practice to add carbon to the $LiFePO_4$ compound in proportions varying between 10% and 15% in weight. Thus, in the article "Conductivity improvements to spray-produced $LiFePO_4$ by addition of a carbon source (Materials letters 58 (2004) pages 1788 to 1791), S. L. Bewlay and al. propose to achieve a composite material of $LiFePO_4/C$ type for a positive electrode of a lithium-ion battery by pyrolitic spraying, adding sucrose designed to form the carbon to the $LiFePO_4$ precursors. But as carbon is a reducer, it can lead to formation of the phosphide compound, at the surface of the $LiFePO_4$ grains, which is liable to destroy a part of the intercalation material. Furthermore, as the density of the composite material obtained is not sufficient, the active volume does not enable such a composite material to be used in any type of application.

OBJECT OF THE INVENTION

It is one object of the invention to provide a method for production of an electrode for a lithium battery that is easy to implement and enables a good electronic conductivity and a high efficiency of the lithium insertion and de-insertion reaction to be obtained.

According to the invention, this object is achieved by the appended claims.

More particularly, this object is achieved by the fact that the method comprises at least the following steps:
   formation of a homogeneous mixture of at least one precursor of the lithium intercalation compound with a specific additional compound that is chemically stable with respect to crystallites and designed to limit the growth of crystallites during formation thereof,
   thermal treatment of the homogeneous mixture so as to synthesize the lithium intercalation compound in the form of crystallites and to obtain a composite material comprising at least two phases respectively formed by the lithium intercalation compound and by the additional compound,
   and shaping of the composite material so as to obtain said electrode.

It is a further object of the invention to provide an electrode for a lithium battery obtained by such a method for production and remedying the shortcomings of the prior art. More particularly, the object of the invention is to provide an electrode having an improved lithium insertion and de-insertion reaction efficiency.

According to the invention, this object is achieved by the fact that the electrode comprises at least one composite material comprising at least two phases respectively formed by a lithium intercalation compound made up of crystallites and by an additional compound that is chemically stable with respect to the crystallites and designed to limit the growth of crystallites during formation thereof.

It is a further object of the invention to provide a lithium battery comprising one such electrode and presenting a high efficiency.

According to the invention, this object is achieved by the fact that the lithium battery comprises at least a first electrode according to the invention, an electrolyte and a second electrode, the second electrode comprising at least one material chosen from metallic lithium, a lithium alloy, a nanometric mixture of a lithium alloy and of a lithium oxide, a material of spinel structure comprising lithium and titanium, a lithium and transition metal nitride, carbon and a lithium intercalation compound.

BRIEF DESCRIPTION OF THE DRAWING

Other advantages and features will become more clearly apparent from the following description of particular embodiments of the invention given as non-restrictive examples only.

A voltage/specific energy capacity curve of a particular embodiment of a lithium battery according to the invention is represented in the accompanying FIG. 1.

DESCRIPTION OF PARTICULAR EMBODIMENTS

Figure 1:
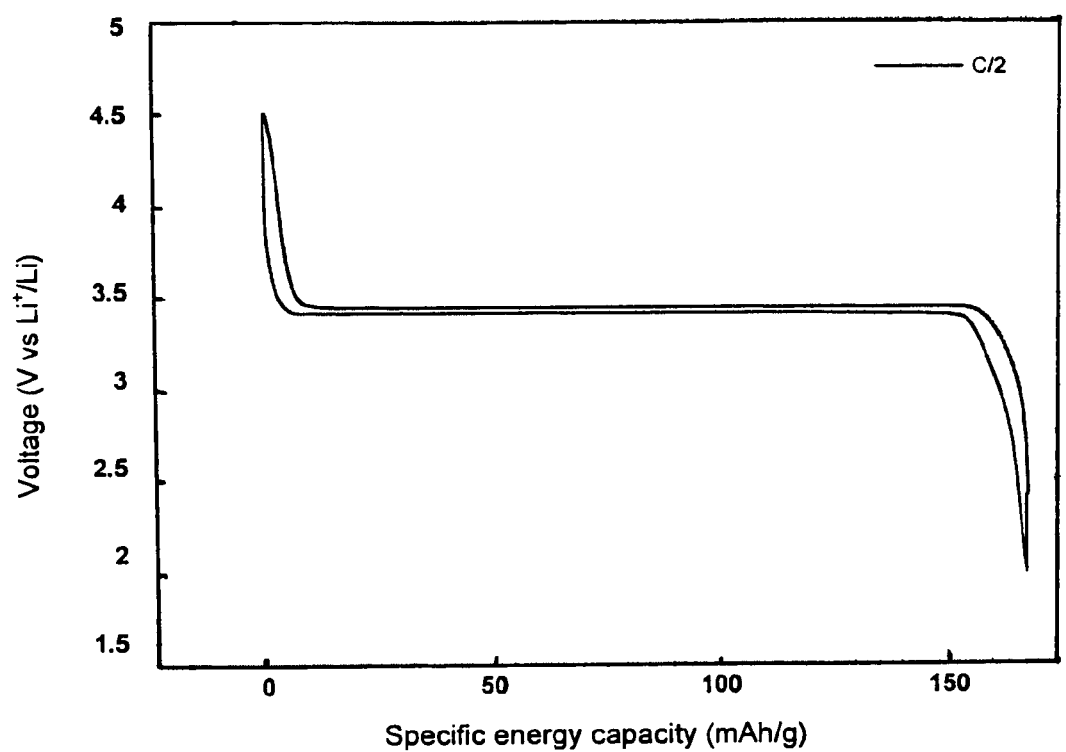

A lithium battery comprises at least first and second electrodes, respectively positive and negative, and an electrolyte. In the lithium secondary battery, the positive electrode comprises at least a active compound generally called lithium insertion compound or lithium intercalation compound. The intercalation compound is formed by crystallites also called crystallized solid particles.

The lithium intercalation compound can for example comprise an oxide chosen from titanium, vanadium, chromium, manganese, iron, cobalt, nickel, molybdenum and niobium oxides and combinations thereof. Such an oxide can also be substituted or combined with lithium oxide, sulphides or selenides of one or more elements chosen from iron, molybdenum, niobium and titanium. It can also be combined with mixed phosphates, silicates or borates of lithium and of an element chosen from titanium, vanadium, chromium, manganese, iron, cobalt, nickel, molybdenum and niobium or with metals or aluminium-based, silicon-based, germanium-based and/or tin-based alloys.

Such an active compound presents the property of successively inserting and de-inserting $Li^+$ cations, when the lithium battery is operating, during the charging and discharging operations.

According to the invention, the lithium intercalation compound is associated in the electrode with a specific additional compound designed to improve the kinetics of the lithium intercalation and de-intercalation reaction, while limiting the growth of crystallites constituting the lithium intercalation compound during formation thereof. What is meant by limiting the growth of crystallites during formation thereof is that the growth of crystallites, and if applicable that of lithium intercalation compound precursors, are limited during synthesis of the lithium intercalation compound or during a subsequent re-crystallization should this be the case.

Adding an additional compound in the electrode, which compound limits the growth of crystallites and is chemically stable with respect to crystallites and preferably refractory, in fact enables the mean distance of the path covered by the electrons in the lithium intercalation compound to be shortened. It enables the efficiency of the lithium insertion and de-insertion reaction to be increased, in particular for reaction kinetics compatible with operating regimes comprised between 0.5 and 2 C. The weight ratio between the proportion of additional compound and the proportion of lithium intercalation compound is preferably lower than or equal to 0.2.

More particularly, improvement of the efficiency of the lithium insertion and de-insertion reaction is obtained by formation of a stable composite material comprising two distinct phases. A first phase is in fact formed by crystallites and is designed to react according to the lithium insertion and de-insertion reaction. The second phase consists of the additional compound having the function of limiting the growth of the crystallites during formation thereof. The second phase is also chemically stable with respect to crystallites, i.e. it does not react chemically with the crystallites in the conditions of synthesis of the latter, of recrystallization or subsequently. The composite material thus formed can also be associated with a further compound chosen from carbon and metals which, due to their intrinsic electronic conductivity, improve the electronic conductivity of the composite material.

The presence of a specific additional compound in the electrode thus enables crystallites of small sizes to be obtained thereby reducing the diffusion length of the electrons in the electrode. The additional compound in fact forms a physical shield against diffusion, in solid phase, of the crystallites constituting the intercalation compound, and this shield limits crystalline growth. Moreover, even the crystallites located at the heart of the electrode, due to their small size, can react in accordance with the reversible lithium insertion and de-insertion reaction.

The additional compound is preferably chosen from the group comprising oxides, nitrides, carbides, borides and silicides of at least one chemical element chosen from manganese, calcium, yttrium, lanthanum, titanium, zirconium, hafnium, vanadium, niobium, tantalum, chromium, molybdenum, tungsten, aluminium, cerium, iron, boron and silicon. More particularly, it is chosen from the group comprising $Y_2O_3$, $Al_2O_3$, $TiO_2$, $ZrO_2$, $CeO_2$, $HfO_2$, $Cr_2O_3$, $La_2O_3$, $Fe_2O_3$, $FeAl_2O_4$, $CaO$, $MgO$, $MgAl_2O_4$, $MgCr_2O_4$ and $Y_2TiO_5$, $TiC$, $B_4C$, $SiC$, $ZrC$, $WC$, $NbC$ and $TaC$, $TiN$, $BN$, $Si_3N_4$ and $AlN$, $TiB_2$ and $VB_2$ and $MoSi_2$. Such compounds are particularly suitable to be additional compounds designed to reduce the size of the crystallites. In addition, they are chemically stable and electrochemically stable when the lithium secondary battery is in operation. Moreover, for equal growth limiting and chemical and electrochemical stability performances, the choice of the additional compound is preferably determined by the highest electronic conduction capacity.

Moreover, the additional compound is preferably chosen such as to limit the size of the crystallites to a value less than or equal to 2 μm and more particularly less than or equal to 200 nm. This limiting of the size of the crystallites is obtained by limiting the growth of the crystallites, in particular during synthesis of the lithium intercalation compound or during recrystallization thereof after mechanical damage.

The additional compound can be in the form of a film having a thickness less than or equal to 200 nm, and preferably less than or equal to 20 nm. The composite material is then in the form of crystallites of the lithium intercalation compound dispersed in a film formed by the additional compound. As this film has to let the $Li^+$ ions pass, it is therefore either discontinuous or continuous but porous to $Li^+$ ions.

The additional compound can also be in the form of solid particles having a diameter less than or equal to 200 nm and preferably less than or equal to 20 nm, and the crystallites are arranged between said particles. In this case, the composite material preferably comprises support elements designed to maintain the cohesion between the different particles. Such a support element can be formed by an organic binder or by any other means.

An electrode for a lithium battery is preferably produced by homogeneously mixing at least one precursor of the lithium intercalation compound with the additional compound. Then thermal treatment of the homogeneous mixture is performed so as to synthesize the lithium intercalation compound in the form of crystallites and to obtain a composite material comprising at least two phases respectively formed by the lithium intercalation compound and by the additional compound. Then the material composite is shaped as an electrode by any type of known means. It can for example be applied on a metal support.

For example, 0.1 mole of dihydrate ferric (II) oxalate ($FeC_2O_4$, $2H_2O$) and 0.1 mole of monobasic lithium phosphate ($LiH_2PO_4$) with 0.00245 mole of yttrium oxide ($Y_2O_3$) are inserted in a planetary mill in an argon atmosphere. $FeC_2O_4$ and $LiH_2PO_4$ are in powder form and form the precursors of the lithium intercalation compound $LiFePO_4$ whereas $Y_2O_3$, in the form of particles having a diameter of 23 nm, forms the additional compound limiting the formation of $LiFePO_4$ crystallites. The powders are then mixed homogeneously for 48 hours in the planetary mill. The mixture collected then undergoes thermal treatment for one hour at 600° C. in an argon atmosphere so as to synthesize the lithium intercalation compound $LiFePO_4$. A composite material in powder form is then obtained and qualitative and quantitative analysis by X-ray diffraction shows the presence of the $LiFePO_4$ phase in the composite material and indicates that it comprises 96.5% weight of $LiFePO_4$, 3.5% weight of $Y_2O_3$ and traces of carbonaceous residues.

85.5% weight of the composite material are then mixed with 6.0% weight of polyvinylidene fluoride, 5.67% weight of graphite, and 2.83% weight of acetylene black. This mixture is then stirred with anhydrous n-methylpyrrolidine so as to obtain a homogeneous fluid ink. The ink is then applied to an aluminium foil strip by means of a micrometric doctor blade, and the strip and ink assembly is then dried at 120° C. to form an electrode of a lithium battery.

Such an electrode is then inserted in a lithium secondary battery of button cell type comprising a negative electrode made of metallic lithium and a microporous separator made of polypropylene imbibed with an electrolyte comprising a mixture of ethylene carbonate (EC) and dimethyl carbonate (DMC), $LiPF_6$. As illustrated in FIG. 1, the voltage/specific capacity curve of the lithium battery thus formed shows that the theoretical capacity achieved, at a charging/discharging rate of C/2, is compatible with the operating conditions necessary for portable applications for which the charging operation is performed in a maximum of one or two hours whereas the discharging operation has to be slow, taking place in about 10 hours.

The invention is not limited to the embodiments described above. Thus it also relates to a lithium battery comprising a first electrode according to the invention, a second electrode and an electrolyte. The second electrode can be formed by any type of material known to be used in lithium batteries. It can for example be constituted by a material forming a $Li^+$ cation source for the positive electrode. The lithium source constituting the negative electrode is for example chosen from metallic lithium, a lithium alloy, a nanometric mixture of a lithium alloy and a lithium oxide, a lithium and transition metal nitride.

In the case where the negative electrode is not formed by a lithium source for the positive electrode, it is formed by a lithium intercalation or insertion material such as carbon in graphite form or a material of spinel structure containing lithium and titanium. In this case, the lithium is never present in metallic form in the lithium battery, the $Li^+$ cations then going backwards and forwards between the two lithium insertion materials of the negative and positive electrodes, on each charging and discharging of the battery.

In this case, the negative electrode can also comprise an additional compound designed to limit the size of the crystallites constituting the lithium insertion material, and possibly also carbon and an organic binder.

Furthermore, the electrolyte of the lithium battery can be formed by any type of known material. It can for example be formed by a salt comprising at least the $Li^+$ cation. The salt is for example chosen from $LiClO_4$, $LiAsF_6$, $LiPF_4$, $LiR_FSO_3$, $LiCH_3SO_3$, $LiN(R_FSO_2)_2$, $LiN(R_FSO_2)_3$, $R_F$ being chosen from a fluorine atom and a perfluoroalkyl group comprising between 1 and 8 carbon atom. The salt is preferably dissolved in an aprotic polar solvent and can be supported by a separating element arranged between the first and second electrodes, the separating element then being imbibed with electrolyte. The salt can also be mixed with a molten salt such as imidazolium salts and derivatives thereof, pyridinium salts and derivatives thereof and quaternary ammonium salts.

It has already been proposed to add an additional compound to the lithium intercalation compound of an electrode, without the added additional compound however enabling the size of the crystallites forming the intercalation compound to be limited, when formation thereof takes place. For example, the Patent Application EP-A-1403944 describes a positive electrode made of "boronized" graphitic material and the method for producing same. The "borated" graphitic material is a compound of a solid solution in which the carbon atoms are partially substituted by boron atoms or by a boron compound such as boron carbide, cobalt boride or hafnium boride. However, unlike the invention, the boron atom or the boron compound in the Patent Application EP-A-1403944 is not chemically stable with respect to the graphitic material constituting the lithium intercalation compound and it is not designed to limit the growth of crystallites during formation thereof. Consequently, the "boronized" graphitic material does not form a stable composite material with two distinct phases. Adding boron or a boron compound, in the Patent Application EP-A-1403944, is on the contrary designed to stabilize the crystalline structure of the graphitic material by introducing partial defects, so as to modify the crystallographic structure of the graphitic material.

The invention claimed is:

1. A method for production of an electrode for a lithium battery including a composite material, the composite material comprising a first phase formed by a lithium intercalation compound made up of crystallites and a second phase constituted by a selected specific additional compound, the method comprising at least the following steps:

forming the composite material, wherein forming the composite material comprises:
  forming a homogeneous mixture of at least one precursor of the lithium intercalation compound with the selected specific additional compound; and
  synthesizing the lithium intercalation compound by heat treatment of the homogeneous mixture, wherein the selected specific additional compound is different from the precursor and is chemically stable with respect to crystallites and to said precursor under the synthesis conditions of the lithium intercalation compound, to limit the growth of the crystallites, and wherein the selected specific additional compound is selected from the group consisting of oxides, nitrides, carbides, borides and silicides of at least one chemical element selected from manganese, calcium, yttrium, lanthanum, titanium, zirconium, hafnium, vanadium, niobium, tantalum, chromium, molybdenum, tungsten, aluminum, cerium, iron, boron and silicon; and shaping of the composite material so as to obtain said electrode.

2. The method according to claim 1, wherein the specific additional compound is selected from the group consisting of $Y_2O_3$, $Al_2O_3$, $TiO_2$, $ZrO_2$, $CeO_2$, $HfO_2$, $Cr_2O_3$, $La_2O_3$, $Fe_2O_3$, $FeAl_2O_4$, CaO, MgO, $MgAl_2O_4$, $MgCr_2O_4$ and $Y_2TiO_5$, TiC, $B_4C$, SiC, ZrC, WC, NbC and TaC, TiN, BN, $Si_3N_4$ and AlN, $TiB_2$ and $VB_2$ and $MoSi_2$.

3. The method according to claim 1, wherein the shaping step comprises at least application of the composite material on a metallic support.

4. The method according to claim 1, wherein at least one further compound selected from the group consisting of carbon and metals is added to the composite material between the thermal treatment step and the shaping step.

5. The method according to claim 1, wherein the composite material has a weight ratio between the proportion of the additional compound and the proportion of the lithium intercalation compound is lower than or equal to 0.2.

6. The method according to claim 1, wherein the crystallites have a size less than or equal to 2 μm in the composite material.

7. The method according to claim 6, wherein the size of the crystallites in the composite material is less than or equal to 200 nm.

8. The method according to claim 1, wherein the additional compound is in form of a film having a thickness less than or equal to 200 nm, the crystallites being dispersed in said film.

9. The method according to claim 8, wherein the thickness of the film is less than or equal to 20 nm.

10. The method according to claim 1, wherein the additional compound is in the form of particles having a diameter less than or equal to 200 nm and separating the crystallites.

11. The method according to claim 10, wherein the diameter of the particles of the additional compound is less than or equal to 20 nm.

\* \* \* \* \*